United States Patent
Tadaki et al.

(10) Patent No.: US 6,362,272 B1
(45) Date of Patent: Mar. 26, 2002

(54) OIL EXTENDED RUBBER AND RUBBER COMPOSITION

(75) Inventors: Toshihiro Tadaki; Naokazu Kobayashi; Hiroshi Akema, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/412,592

(22) Filed: Oct. 6, 1999

(30) Foreign Application Priority Data

Oct. 7, 1998 (JP) .......................................... 10-285751

(51) Int. Cl.$^7$ ............................. C08K 5/16; C08K 3/04; C08K 3/36

(52) U.S. Cl. ....................... 524/555; 524/493; 524/496; 526/335; 526/340

(58) Field of Search ........................... 525/332.9, 332.8, 525/333.1, 366, 367, 332.7, 374, 259, 296; 524/492, 555, 493, 495, 496; 526/347, 335, 340

(56) References Cited

U.S. PATENT DOCUMENTS 6,013,737 A * 1/2000 Takagishi et al. ........ 525/332.7

FOREIGN PATENT DOCUMENTS

| EP | 447066 | 9/1991 |
|---|---|---|
| EP | 609010 | 8/1994 |
| EP | 661298 | 7/1995 |
| EP | 0 849 321 | 6/1998 |
| EP | 0 916 699 | 5/1999 |
| EP | 0 924 227 A1 * | 6/1999 |
| EP | 0 924 227 | 6/1999 |
| JP | 52-005071 | 1/1977 |
| JP | 5-8154742 | 9/1983 |
| JP | 58-162604 | 9/1983 |
| JP | 58-189203 | 11/1983 |
| JP | 59-038209 | 3/1984 |
| JP | 10-22940 | 1/1989 |
| JP | 1-101344 | 4/1989 |
| JP | 1-188501 | 7/1989 |
| JP | 5-001298 | 1/1993 |
| JP | 5-230286 | 9/1993 |
| JP | 6-199923 | 7/1994 |
| JP | 6-279515 | 10/1994 |
| JP | 7-053616 | 2/1995 |
| JP | 9-071687 | 3/1997 |
| JP | 9-227636 | 9/1997 |
| WO | 8805448 | 7/1988 |

OTHER PUBLICATIONS

Derwent Abstracts, AN 1997–498360, JP 09–235323, Sep. 9, 1997.
Derwent Abstracts, AN 1984–091610, JP 59–038209, Mar. 2, 1984.
Derwent Abstracts, AN 97–486446/199745, JP 9–227636, Sep. 2, 1997.
Derwent Abstracts, AN 95–233278/199531, EP 661298, Jul. 5, 1995.
Derwent Abstracts, AN 94–242358/199430, EP 609010, Aug. 3, 1994.
Derwent Abstracts, AN 91–275676/199138, EP 447066, Sep. 18, 1991.
Derwent Abstracts, AN 89–071719/198910, JP 1–022940, Jan. 20, 1989.
Derwent Abstracts, AN 88–220295/198831, WO 8805448, Jul. 28, 1988.
Derwent Abstracts, AN 83–797460/198343, JP 58–154742, Sep. 14, 1983.

* cited by examiner

Primary Examiner—David W. Wu
Assistant Examiner—R. Harlan
(74) Attorney, Agent, or Firm—Oblon, Spivak, McClelland, Maier & Neustadt, P.C.

(57) ABSTRACT

An oil extended rubber comprising 100 parts by weight of (A) an amino group-containing copolymer rubber of a conjugated diolefin and an aromatic vinyl compound which contains bonded amino groups in the amount of 0.0025–0.20 mmol/g polymer, and 10–100 parts by weight of (B) an extensible oil. Carbon black, silica, a mixture of carbon black and silica, or a carbon-silica dual-phase-filler can be homogeneously dispersed in the oil extended rubber. Vulcanized products obtained by vulcanizing the rubber exhibits well-balanced improved properties such as wet skid properties, low hysteresis loss properties, abrasion resistance, and breaking strength, and are useful as a tread material for low fuel consumption tires, large tires, and high performance tires.

9 Claims, No Drawings

OIL EXTENDED RUBBER AND RUBBER COMPOSITION

BACKGROUND OF THE INVENTION

1. Field of the Invention

The present invention relates to an oil extended rubber and rubber composition. More particularly, the present invention relates to an oil extended rubber which can produce vulcanized products exhibiting well-balanced improved properties such as wet skid properties, low hysteresis loss properties, abrasion resistance, and breaking strength, and is useful as a tread material for low fuel consumption tires, large tires, and high performance tires.

2. Description of the Background Art

Development of a conjugated diolefin-type rubber material for use in tires exhibiting reduced rolling resistance, high abrasion resistance, excellent breaking strength, as well as superior operational stability performance typified by superior wet skid properties is desired to respond to recent demand for vehicles with a low fuel consumption.

Rolling resistance can generally be reduced by decreasing the hysteresis loss of vulcanized rubber. Impact resilience at 50–80° C., tan δ at 50–80° C., and small Goodrich heat generation, and the like are used as an index of evaluation of the hysteresis loss of vulcanized rubber materials. Specifically, rubber materials with a large impact resilience at 50–80° C., a small tan δ at 50–80° C., and a small Goodrich heat generation are preferable.

Natural rubbers, polyisoprene rubber, or polybutadiene rubber, and so on are known as rubber materials with low hysteresis loss. A problem with these rubber materials is their low wet skid resistance.

On the other hand, a rubber composition comprising silica or a mixture of silica and carbon black as a reinforcing agent (filler) has been proposed recently as a rubber material exhibiting low rolling resistance and good wet skid resistance. However, tire treads with such a reinforcing agent incorporated therein has a problem that the vulcanized products exhibit low tensile strength and abrasion resistance. Moreover, a silica-containing composition exhibits inferior processability as compared with a carbon black-containing composition, resulting in an increased processing cost.

Various rubber compositions comprising polymers in which functional groups exhibiting affinity with silica have been introduced have been proposed to improve tensile strength and abrasion resistance of vulcanized products made from rubber compositions containing such a reinforcing agent. For example, Japanese Patent Publication No. 36957/1974 discloses a method of manufacturing polymers by reacting silicon tetrahalide, trihalosilane, or the like. Japanese Patent Publication No. 5071/1977 discloses a method of manufacturing polymers which are modified with a halogenated silane compound. Moreover, Japanese Patent Application Laid-open No. 188501/1989 discloses a diene-type rubber with an alkyl silyl group introduced therein, and Japanese Patent Application Laid-open No. 230286/1993 discloses a diene-type rubber with a halogenated silyl group introduced. Japanese Patent Applications Laid-open No. 101344/1989, No. 22940/1989, and No. 71687/1997 disclose diene-type rubbers with an amino group introduced therein, as polymers for use with an addition of silica. These polymers with amino groups introduced are known as effective modified polymers for the addition not only of silica, but also of carbon black. Examples of such polymers include (1) polymers obtained by introducing an amino group at the initial chain end of the polymer using a lithium amide initiator (Japanese Patent Application Laid-open No. 38209/1984, Japanese Patent Publication No. 1298/1993, Japanese Patent Applications Laid-open No. 279515/1994, No. 199923/1994, and No. 53616/1995) and (2) various styrene-butadiene copolymers of different structures polymerized using an organolithium initiator, of which the terminals are modified with a nitrogen-containing compound such as a urea compound (Japanese Patent Application Laid-open No. 27338/1986) or a dialkyl amino benzophenone compound (Japanese Patent Applications Laid-open No. 162604/1983 and No. 189203/1983). Improvement in the properties are attempted by using these modified polymers as polymer components in the composition to which such a reinforcing agent has been incorporated.

However, a rubber composition comprising a polymer in which functional groups having affinity with silica are introduced tends to exhibit impaired processability. Poor processability not only increases the cost, but also impairs blending characteristics of components, such as insufficient dispersion of reinforcing agents and the like, which results in worsening of properties.

The present invention has been completed in view of this situation. Specifically, an object of the present invention is to provide an oil extended rubber and a composition comprising the oil extended rubber, which can produce vulcanized products exhibiting well-balanced improved properties such as wet skid properties, low hysteresis loss properties, abrasion resistance, and breaking strength, and is useful as a tread material for low fuel consumption tires, large tires, and high performance tires, in the case where either carbon black or silica, or both, is used or in the case where a carbon-silica dual-phase-filler is used.

As a result of extensive studies, the present inventors have found that the above object can be achieved by an oil extended rubber comprising an amino group-containing copolymer rubber of a conjugated diolefin and an aromatic vinyl compound containing a specific amount of bonded amino groups and extensible oil at a specific proportion.

SUMMARY OF THE INVENTION

Specifically, the present invention provides the following oil extended rubber and rubber composition.

[1] An oil extended rubber comprising 100 parts by weight of (A) an amino group-containing copolymer rubber of a conjugated diolefin and an aromatic vinyl compound which contains bonded amino groups in the amount of 0.002–0.20 mmol/g polymer, and 10–100 parts by weight of (B) an extensible oil.

[2] The oil extended rubber of [1] above, wherein at least 40 wt % of the copolymer rubber of a conjugated diolefin and an aromatic vinyl compound (A) is a polymer modified by a compound selected from the group consisting of alkoxysilanes represented by the following formula (1), halogen-containing silicon compounds, ketone compounds, and tin compounds:

$$X_nSi(OR)_mR'_{4-(m+n)} \quad (1)$$

wherein X is a halogen atom, R is a hydrocarbon group having 1–20 carbon atoms, R' is an alkyl group, aryl group, vinyl group, or alkyl halide group having 1–20 carbon atoms, m is an integer of 1–4, and n is an integer of 0–2, provided that m+n is 2–4.]

[3] The oil extended rubber of [1] or [2] above, wherein said copolymer rubber of a conjugated diolefin and an aromatic vinyl compound contains 40 wt % or more of a single chain aromatic vinyl compound unit consisting of an independently linked aromatic vinyl compound and less than 10 wt % of a long chain aromatic vinyl compound unit comprising 8 or more linked molecules of aromatic vinyl compound.

[4] The oil extended rubber described in any one of [1] to [3] above, wherein the Mooney viscosity (ML 1+4, 100° C.) of the copolymer rubber of a conjugated diolefin and an aromatic vinyl compound (A) is from 80 to 200.

[5] The oil extended rubber of any one of [1] to [4] above, wherein the molecular weight distribution of the copolymer rubber of a conjugated diolefin and an aromatic vinyl compound (A) represented by the ratio of the weight average molecular weight (Mw) and the number average molecular weight (Mn) (Mw/Mn) is from 1.3 to 3.0.

[6] The oil extended rubber described in any one of [1] to [5] above, wherein said extensible oil (B) is at least one oil selected from aromatic-type mineral oil having a viscosity gravity constant (V.G.C. value) of 0.900–1.049 (aromatic oil) and an alicyclic-type mineral oil having a viscosity gravity constant (V.G.C. value) of 0.850–0.899 (naphthenic oil).

[7] The oil extended rubber according to any one of [1] to [6], which is obtained by adding an extensible oil to a rubbery polymer solution containing the copolymer rubber of a conjugated diolefin and an aromatic vinyl compound (A), removing the solvent from the mixture, and drying the residue.

[8] A rubber composition comprising the oil extended rubber of any one [1]–[7] above in an amount of 30 wt % or more of the total amount of rubber components and carbon black and/or silica, respectively, in an amount of 2–100 parts by weight or 30–100 parts by weight for 100 parts by weight of the total amount of rubber components, as fillers, and, when silica is contained, a silane coupling agent in an amount of 1–20 parts by weight for 100 parts by weight of silica.

[9] A rubber composition comprising, the oil extended rubber of any one of [1]–[7] above in an amount of 30 parts by weight or more of the total amount of rubber components and, as fillers, (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase-fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica.

[10] The rubber composition of [8] or [9] above, of which the vulcanized product is used for tire tread.

Other objects, features and advantages of the invention will hereinafter become more readily apparent from the following description.

DETAILED DESCRIPTION OF THE INVENTION AND PREFERRED EMBODIMENTS

The present invention will now described in more detail by way of embodiments.

I. Oil Extended Rubber

The oil extended rubber of the present invention comprises 100 parts by weight of (A) an amino group-containing copolymer rubber of a conjugated diolefin and an aromatic vinyl compound which contains bonded amino groups in the amount of 0.0025–0.20 mmol/g polymer (hereinafter called "copolymer rubber (A)"), and 10–100 parts by weight of (B) an extensible oil (hereinafter called "extensible oil (B)". Each components for the composition will now be described in more detail.

1. Copolymer Rubber (A)

The oil extended rubber (A) used in the present invention is an amino group-containing copolymer rubber of a conjugated diolefin and an aromatic vinyl compound which contains bonded amino groups in the amount of 0.0025–0.20 mmol/g polymer, preferably 0.0030 to 0.1 mmol/g polymer, and more preferably 0.0030–0.05 mmol/g polymer. Specifically, the copolymer rubber (A) is a copolymer of a conjugation diolefin and an aromatic vinyl compound, with amino groups bonded on the polymer chain.

(1) Conjugated Diolefin

The conjugated diolefins used in the present invention include, but are not limited to, 1,3-butadiene, isoprene, 2,3-dimethyl-1,3-butadiene, 2-chloro-1,3-butadiene, 1,3-pentadiene, and mixtures of these.

Although there are no specific limitations to the content of 1,2-bond and/or 3,4-bond (hereinafter called "vinyl bonds") of the conjugation diolefin part in the copolymer rubber (A), such a content is preferably from 10 to 90 wt %, and particularly preferably from 15 to 80 wt %. If the vinyl bond content is less than 10 wt %, the resulting product may have inferior wet skid resistance and poor handling stability. If more than 90 wt %, the product may exhibit impaired breaking strength and abrasion resistance, and a large hysteresis loss.

(2) Aromatic Vinyl Compound

The aromatic vinyl compounds used in the present invention include, but are not limited to, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, vinyl benzyl dimethylamine, (4-vinylbenzyl)dimethyl aminoethyl ether, N,N-dimethylaminoethyl styrene, tert-butoxystyrene, vinylpyridine, and mixtures of these. Of these, styrene is preferable.

Although there are no specific limitations to the amount of aromatic vinyl compounds used for the copolymer rubber (A), a preferable amount is from 5 to 60 wt %, and more preferably from 10 to 50 wt %. If the amount of the aromatic vinyl compounds is less than 5 wt %, wet skid properties, abrasion resistance, and breaking strength may be impaired. If more than 60 wt %, hysteresis loss may increase. The copolymer rubber (A) preferably comprises 40 wt % or more of a single chain aromatic vinyl compound unit in which an aromatic vinyl compound is linked singly and 10 wt % or less of a long chain aromatic vinyl compound unit in which 8 or more aromatic vinyl compounds are linked. The length of linked chains of aromatic vinyl compounds can be measured by an ozonolysis-gel permeation chromatography method developed by Tanaka et al (Polymer, Vol. 22, Pages 1721–1723 (1981)). If the content of the single chain aromatic vinyl compound unit in which an aromatic vinyl compound is linked singly is less than 40 wt %, or the content of the long chain aromatic vinyl compound unit in which 8 or more aromatic vinyl compounds are linked is more than 10 wt %, the copolymer rubber (A) exhibits inadequate low loss hysteresis.

(3) Bonded Amino Groups

The amino groups may be bonded to either the terminal or side of the polymer chain of the copolymer rubber (A), with the bonding to the terminal being more preferable. There is no specific restriction to the bonding amino groups. The amino groups shown by the following formulae (a1) or (a2) can be given as preferable examples.

(a1)

wherein, $R^1$ represents a hydrogen atom, an alkyl group having 1–20 carbon atoms, or an aryl group having 6–20 carbon atoms, and $R^2$ represents an alkyl group having 1–20 carbon atoms and aryl group having 6–20 carbon atoms.

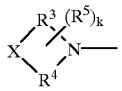

(a2)

wherein, $R^3$ and $R^4$ individually represent an alkylene group having 1–6 carbon atoms, X represents a divalent organic group selected from —$CH_2$—, —O—, and —NH—, $R^5$ represents a hydrogen atom or an alkyl group having 1–5 carbon atoms, and k is an integer from 1 to 4.

The alkyl groups having 1–20 carbon atoms represented by $R^1$ or $R^2$ in the formula (a1) may be either linear or branched. For example, methyl, ethyl, n-propyl, iso-propyl, n-butyl, iso-butyl, sec-butyl, t-butyl, n-pentyl, n-hexyl, n-heptyl, octyl, nonyl, decyl, undecyl, dodecyl, pentadecyl, octadecyl, and eicosanyl, can be given. As examples of aryl groups having 6–20 carbon atoms represented by $R^1$ or $R^2$, phenyl, tolyl, xylyl, cumyl, naphthyl, biphenyl, and the like can be given.

As examples of the alkylene group having 1–6 carbon atoms represented by $R^3$ or $R^4$, methylene group, 1,2-ethylene group, 1,3-trimethylene group, 1,4-tetramethylene group, 1,5-pentamethylene group, 1,6-hexamethylene group, and the like can be given. For example, methyl, ethyl, n-propyl, iso-propyl, n-butyl, iso-butyl, sec-butyl, t-butyl, n-hexyl, and the like can be given.

Given as specific examples of the structures shown by the above formula (a1) or (a2) are dimethylamino group, diethylamino group, dipropylamino group, di-N-butylamino group, diisobutylamino group, dipentylamino group, dihexylamino group, di-N-butylamino group, diheptylamino group, dioctylamino group, diallylamino group, dicyclohexylamino group, butylisopropylamino group, dibenzylamino group, methylbenzylamino group, dibenzylamino group, methylhexylamino group, ethylhexylamino group, trimethyleneimino group, tetramethyleneimino group, 2-methyltetramethyleneimino group, 3-methyltetramethyleneimino group, pentamethyleneimino group, 2-methylpentamethyleneimino group, 3-methylpentamethyleneimino group, 4-methylpentamethyleneimino group, 3,5-dimethylpentamethyleneimino group, 2-ethylpentamethyleneimino group, hexamethyleneimino group, heptamethyleneimino group, and dodecamethyleneimino group.

The content of these amino groups is in the range of 0.0025–0.20 mmol/g polymer, preferably 0.0030–0.10 mmol/g polymer, and more preferably 0.0030–0.05 mmol/g polymer. If the content of the amino groups is in the above range, fillers such as silica can be homogeneously dispersed in the compounded rubber (i.e. the oil extended rubber of the present invention), resulting in vulcanized products exhibiting excellent processability, and various other properties such as hysteresis loss properties, abrasion resistance, and breaking strength.

(4) Mooney Viscosity

It is desirable that the copolymer rubber (A) has a Mooney viscosity (ML 1+4, 100° C.) in the range from 80 to 200, and preferably from 90 to 200. This is because the Mooney viscosity (ML 1+4, 100° C.) of the oil extended rubber which consists of 100 parts by weight of copolymer rubber (A) and 10–100 parts by weight of extensible oil (B) should be in the range from 20 to 100. If the Mooney viscosity (ML 1+4, 100° C.) of the oil extended rubber is less than 20, not only abrasion resistance and low hysteresis loss properties are impaired, but also tackiness of the rubber increases, resulting in difficulty in handling, large cold flow, and poor storage stability. If the Mooney viscosity (ML 1+4, 100° C.) of the oil extended rubber is more than 100, not only processability (such as easiness in kneading by a kneader, easiness in winding the sheets made from the rubber composition by a roller mill, excellent smoothness of the surface of the sheets, tidy edge of the sheets, etc.) is impaired and the cost of processing is increased, but also the components cannot be blended well so that reinforcing agents and the like are only insufficiently dispersed, which results in decrease in abrasion resistance, mechanical strength, and low hysteresis loss.

(5) Molecular Weight Distribution

The molecular weight distribution of the copolymer rubber (A) represented by the ratio of the weight average molecular weight (Mw) and the number average molecular weight (Mn) (Mw/Mn) is preferably from 1.3 to 3.0. Processability of the product is impaired, if the Mw/Mn is less than 1.3. The poor processability not only increases the cost, but also impairs blending characteristics of components, such as insufficient dispersion of reinforcing agents and other additives, which may result in worsening of properties. If Mw/Mn is more than 3.0, the content of low molecular weight components increases and low loss performance becomes worse.

(6) Manufacturing Method

The methods for manufacturing the copolymer rubber (A) of the present invention include, but are not limited to, the following method (1)–(3), for example.

①: Method (1): A method of reacting an organo monolithium compound with a vinyl compound containing an amino group with the above-mentioned structure of the formula (a1) and/or (a2) or a conjugation diolefin compound in a hydrocarbon solvent, followed by copolymerization of the conjugation diolefin and an aromatic vinyl compound.

As the aromatic vinyl compound having an amino group with the structure of formula (a1) and/or (a2) used in the method (1), p-dimethylamino styrene, p-diethylamino styrene, p-dimethylaminomethyl styrene, p-(2-dimethylaminoethyl) styrene, m-(2-dimethylaminoethyl) styrene, p-(2-diethylaminoethyl) styrene, p-(2-dimethylaminovinyl) styrene, p-(2-diethylaminovinyl) styrene, vinylbenzyl tetramethylene amine, vinylbenzyl pentamethylene amine, vinylbenzyl hexamethylene amine, vinylbenzyl heptamethylene amine, vinylbenzyl octamethylene amine, and the like can be given.

②: Method (2): A method of copolymerizing the conjugated diolefin and aromatic vinyl compound, using the reaction product of a secondary amine compound containing amino groups of the above-mentioned structure of formula (a1) and/or (a2) and an organic alkali metal compound, or an alkali metal amide compound containing amino groups having the above-mentioned structure of formula (a1) and/or (a2), as a polymerization initiator.

As the secondary amine compound containing the amino group having the structure of formula (a1) used in the method (2), dimethylamine, diethylamine, dipropylamine, di-n-butylamine, di-sec-butylamine, dipentylamine, dihexylamine, di-n-octylamine, di-(2-ethylhexyl) amine, dicyclohexylamine, n-methylbenzylamine, diallylamine, and the like can be given.

Given as specific examples of the secondary amine compound having the structure of formula (a2) used in the method (2) are morpholine, piperazine, 2,6-dimethylmorpholine, 2,6-dimethylpiperazine, triethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3,2,2]nonane, and carbazole.

The alkali metal amide compound having the structure of formula (a1) and/or (a2) is a compound with the hydrogen atom on the secondary amine compound having the above-mentioned structure of formula (a1) and/or (a2) substituted by an alkali metal (such as Li, Na, K, R, or Sc).

③: Method (3): A method of copolymerizing the conjugated diolefin and aromatic vinyl compound, using a reaction product of a tertiary amine compound containing amino groups of the above-mentioned structure of formula (a1) and/or (a2) and an organic alkali metal compound, or an alkali metal compound containing amino groups having the above-mentioned structure of formula (a1) and/or (a2), as a polymerization initiator.

As the tertiary amine compound having the structure of formula (a1) used in the method (3), N,N-dimethyl-o-toluidine, N,N-dimethyl-p-toluidine, N,N-dimethyl-m-toluidine, α-picoline, β-picoline, γ-picoline, and the like can be given. As the tertiary amine compound having the structure of formula (a2), N,N-tetramethylene-o-toluidine, N,N-heptamethylene-o-toluidine, N,N-hexamethylene-o-toluidine, and the like can be given. The alkali metal compound containing amino groups having the structure of formula (a1) and/or (a2) is a compound with the active hydrogen atom on the tertiary amine compound containing amino groups having the above-mentioned structure of formula (a1) and/or (a2) substituted by an alkali metal (such as Li, Na, K, R, or Sc).

An organolithium compound is preferable as the organic alkali metal compound which is reacted with the secondary amine compound or tertiary amine compound containing amino groups with the structure of formula (a1) and/or (a2) in the above-mentioned methods ② or ③. Specific examples are ethyl lithium, propyl lithium, n-butyl lithium, sec-butyl lithium, tert-butyl lithium, and hexyl lithium, with n-butyl lithium and sec-butyl lithium being particularly preferred. Of these, n-butyl lithium and sec-butyl lithium are preferable.

The reaction of the above-mentioned secondary amine compound or tertiary amine compound and the organic alkali metal compound is carried out using these compounds in the amounts so that the molar ratio of active hydrogen bonded to the nitrogen atom of secondary amine compound or tertiary amine compound and the organic alkali metal compound is in the range from 1:0.2 to 1:5.0, preferably from 1:0.5 to 1:2.0, and more preferably from 1:0.8 to 1:1.2. If the molar ratio of the organic alkali metal compound is greater than 5.0 for the amount of amino group (NH) in the structure of secondary amine compound or active hydrogen in the structure of tertiary amine compound, the effect on improvement of breaking strength, abrasion resistance, and low hysteresis remains low. On the other hand, a molar ratio of the organic alkali metal compound smaller than 0.2 remarkably retards the polymerization speed and significantly decreases productivity, giving rise to low efficiency of the modification reaction for modifying the polymer terminals with functional groups. It is possible to cause a secondary amine compound and an organic alkali metal compound to react prior to polymerization in a separate vessel, and to supply the reaction product to the polymerization reactor.

Although the reaction of a secondary or tertiary amine compound and an organic alkali metal compound instantaneously proceeds in principle, it is possible to provide an aging time of about 1–180 minutes.

Because the reaction product is relatively stable in a nitrogen atmosphere, the product may be used either immediately after the reaction or after storage for about 10 days to two weeks.

This reaction is carried out preferably at a temperature of 0–120° C. It is possible to react the a secondary or tertiary amine compound and an organic alkali metal compound in a polymerization reactor in the presence of monomers of conjugated diolefin and aromatic vinyl compound, successively followed by polymerization of the latter monomers. The reaction temperature may be the same as the polymerization initiation temperature, and may be optionally selected from the range of 0–120° C.

The polymerization reaction and modification reaction for obtaining the copolymer rubber (A) are carried out either at a constant temperature or while raising temperature, usually in the temperature range of 0–120° C. Either a batch polymerization system or a continuous polymerization system may be used for the polymerization reaction.

When preparing the reaction product of a secondary amine compound and an organic alkali metal compound (e.g. an organolithium compound) or the polymerization initiator comprising a metallic amide compound (e.g. secondary lithium amide compound), it is desirable to effect a quick polymerization reaction to add conjugated diolefin compounds such as 1,3-butadiene and isoprene in an amount of 1–100 times mol, preferably 1–50 times mol, the amount of components for such a polymerization initiator.

Ether compounds such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, Bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, and dimethoxyethane and/or tertiary amine compounds such as butyl ether of triethylamine, pyridine, N,N,N',N'-tetramethyl ethylenediamine, dipiperidinoethane, methyl ether of N,N-diethylethanolamine, ethyl ether of N,N-diethylethanolamine, and N,N-diethylethanolamine may be optionally added to the polymerization mixture to adjust the micro-structure (the content of vinyl bond) of the conjugated diolefin portion of diolefin-type (co)polymer.

As preferable hydrocarbon solvents used in the preparation of copolymer rubber (A) by copolymerization of a conjugated diolefin and a vinyl aromatic compound, pentane, hexane, heptane, octane, methylcyclopentane, cyclohexane, benzene, and xylene can be given, for example.

A potassium compound may be added together with the polymerization initiator to increase the reactivity of the initiator, to randomly arrange aromatic vinyl compounds introduced in the polymer, or to provide a single chain of aromatic vinyl compounds. Given as examples of the potassium compound which may be added together with the polymerization initiator are potassium alkoxides or potassium phenoxides, such as potassium isopropoxide, potassium t-butoxide, potassium t-amyloxide, potassium n-heptaoxide, potassium benzyloxide, potassium phenoxide; potassium salts of carboxylic acids such as isovalerianic acid, caprylic acid, lauryl acid, palmitic acid, stearic acid, oleic acid, linolenic acid, benzoic acid, phthalic acid, or 2-ethylhexanoic acid; potassium salts of organic sulfonic acids such as dodecyl benzenesulfonic acid, tetradecyl benzenesulfonic acid, hexadecyl benzenesulfonic acid, or octadecyl benzenesulfonic acid; and potassium salts of organic phosphorous acids such as diethyl phosphite, diisopropyl phosphite, diphenyl phosphite, dibutyl phosphite, and dilauryl phosphite.

These potassium compounds may be added in an amount of 0.005–0.5 mol for one gram atom equivalent of lithium in the organiolithium compound used in the preparation of the polymerization initiator. If less than 0.005 mol, a sufficient effect of the addition of potassium compounds, such as improved reactivity of the polymerization initiator, random arrangement of aromatic vinyl compounds, or introduction of simple chains of aromatic vinyl compounds, cannot be achieved. On the other hand, the amount of the potassium compounds of more than 0.5 significantly decreases productivity and lowers the efficiency of modification reaction for modifying the polymer terminals with functional groups.

In the preparation of copolymer rubber (A) according to the methods ② or ③, an alkali metal alkoxide compound may be added together with the polymerization initiator to increase the polymerization reactivity. The alkali metal alkoxide compound can be prepared by reacting an alcohol with the corresponding structure and an organic alkali metal compound. This reaction may be carried out in a hydrocarbon solvent in the presence of monomers conjugated diolefin and aromatic vinyl compound prior to the copolymerization of these monomers. Given as examples of the alkali metal alkoxide compound are metal alkoxides of tetrahydrofurfuryl alcohol, N,N-dimethyl ethanolamine, N,N-diethyl ethanolamine, 1-piperazine ethanolamine, or the like.

An organiolithium compound is preferable as the organic alkali metal compound to be reacted with an alcohol compound to prepare an alkali metal alkoxide. For example, ethyl lithium, propyl lithium, n-butyl lithium, sec-butyl lithium, tert-butyl lithium, and hexyl lithium, and mixtures of these can be given. Of these, n-butyl lithium and sec-butyl lithium are preferable. The molar ratio of an alcoholic compound and an organiolithium compound should be from 1:0.7 to 1:5.0, preferably from 1:0.8 to 1:2.0, and more preferably from 1:0.9 to 1:1.2. If the molar ratio of an organiolithium compound to an alcoholic compound is more than 5.0, the effect on improvement of breaking strength, abrasion resistance, and low hysteresis remains low. On the other hand, a molar ratio of the organiolithium compound smaller than 0.8 remarkably retards the polymerization speed and significantly decreases productivity, giving rise to low efficiency of the modification reaction for modifying the polymer terminals with functional groups.

(7) Modified Copolymer Rubber

At least 40 wt %, preferably at least 45 wt %, and more preferably at least 50 wt % of the copolymer rubber (A) may be modified with at least one compound selected from the group consisting of alkoxysilane compounds, halogen-containing silicon compounds, ketone compounds, and tin compounds (such a compound hereinafter may be called "modification agent" or "terminal modification agent" and the copolymer rubber (A) thus modified may be called "copolymer rubber (A')").

Among these modification agents, alkoxysilane compounds of the above formula (1) are preferred.

① Alkoxysilane Shown by the Above Formula (1)

As mentioned above, at least 40% of the copolymer rubber (A) used in the present invention is preferably a modified copolymer rubber in which the polymer chain formed by the polymerization of a conjugation diolefin and an aromatic vinyl compound (e.g. a living anion polymer chain) is modified by reacting the alkoxysilane of the above-described formula (1).

The formula (1) is again reproduced here for the sake of description of alkoxysilanes.

$$X_nSi(OR)_mR'_{4-(m+n)} \quad (1)$$

wherein X is a halogen atom, R is a hydrocarbon group having 1–20 carbon atoms, R' is an alkyl group, aryl group, vinyl group, or alkyl halide group having 1–20 carbon atoms, m is an integer of 1–4, and n is an integer of 0–2, provided that m+n is 2–4.

An alkoxylsilyl group is introduced into the copolymer rubber (A) by thus reacting an alkoxysilane with the reactive polymerization chain terminal.

As examples of the halogen atom shown by X in the above formula (1), chlorine atom, bromine atom, and iodine atom can be given.

As the group represented by R, hydrocarbon groups having 1–20 carbon atoms such as, for example, a hydrocarbon group having three carbon atoms on the α-position carbon, a hydrocarbon group having one or more hydrocarbon group with one or more carbon atom bonded on the β-position carbon, and aromatic hydrocarbons such as phenyl group or tolyl group can be given.

Given as specific examples of the hydrocarbon group represented by R' are alkyl groups having 1–20 carbon atoms such as a methyl group, ethyl group, n-propyl group, and t-butyl group; aryl groups having 6–20 carbon atoms such as phenyl group, tolyl group, and naphthyl group; vinyl group; and alkyl halide groups having 1–20 carbon atoms such as chloromethyl group, bromomethyl group, iodinemethyl group, and chloroethyl group.

The alkoxysilane (silane compound) of the above formula (1) is preferably an alkoxysilane compound having a non-hydrolyzable alkoxy group (non-hydrolyzable alkoxy group having 4–20 carbon atoms).

In the above formula (1), the compound with n=0 and m=2 is a dialkyl dialkoxysilane, the compound with n=0 and m=3 is a monoalkyl trialkoxysilane, the compound with n=0 and m=4 is a tetraalkoxysilane, the compound with n=1 and m=1 is a monohalogenodialkyl monoalkoxysilane, the compound with n=1 and m=2 is a monohalomonoalkyl dialkoxysilane, the compound with n=1 and m=3 is a monohalogenotrialkoxysilane, the compound with n=2 and m=1 is dihalogenomonoalkyl monoalkoxysilane, the compound with n=2 and m=2 is dihalogenodialkoxysilane. All these compounds exhibit reactivity with active terminals of living polymers.

A monoalkyl trialkoxysilane (n=0, m=3), tetraalkoxysilane (n=0, m=4), and monohalomonoalkyl dialkoxysilane (n=1, m=2) are preferable because of their capability of improving processability by coupling living polymers and also of providing polymers with functional groups having high affinity with silica or the like.

Given as specific examples of silane compounds of the above formula (1) which are preferably used in the present invention are tetrakis(2-ethylhexyloxy)silane, tetraethoxysilane, tetraphenoxysilane, methyltris(2-ethylhexyloxy)silane, ethyltris(2-ethylhexyloxy)silane, methyltriphenoxysilane, ethyltriphenoxysilane, vinyltris(2-ethylhexyloxy)silane, vinyltriphenoxysilane, methylvinylbis(2-ethylhexyloxy)silane, ethylvinyldiphenoxysilane, tri-t-butoxymonochlorosilane, triphenoxymonochlorosilane, monochloromethyldiphenoxysilane, monochloromethylbis(2-ethylhexyloxy)silane, monobromoethyldiphenoxysilane, monobromo inyldiphenoxysilane, monobromoisopropenylbis(2-ethylhexyloxy)silane, dichloro-di-t-butoxysilane, ditolyldichlorosilane, di-t-butoxydiiodinesilane, diphenoxyiodinesilane, methyltris(2-methylbutoxy)silane, vinyltris(2-methylbutoxy)silane, monochloromethylbis(2-methylbutoxy)silane, and vinyltris(3-methylbutoxy) silane. Among these silane compounds, those with n=0 or 1 are preferred, with monochloromethyldiphenoxysilane, vinyltris(2-ethylhexyloxy)silane, and monochlorovinylbis(2-ethylhexyloxy)silane being particularly preferred.

These silane compounds can be used either individually or in combinations of two or more.

② Halogen-containing Silicon Compounds

A halogen-containing silicon compound can be used as a modification agent in the present invention. The "halogen-containing silicon compound" used in the present invention indicates all halogen-containing silicon compounds other than the alkoxysilanes (silane compounds) of the formula (1) mentioned in ① above. Dibutyldichlorosilicon, methyltrichlorosilicon, methyldichlorosilicon, tetrachlorosilicon, and the like can be given as examples of such a halogen-containing silicon compound.

These halogen-containing silicon compounds can be used either individually or in combinations of two or more.

③ Ketone Compound

A ketone compound can be used as a modification agent in the present invention. As the ketone compound, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, N,N,N',N'-tetramethyl-1,4-diaminobenzophenone, N,N,N',N'-tetraethyl(4',4'-diamino)-benzophenone, and the like can be given.

These ketone compounds can be used either individually or in combinations of two or more.

④ Tin Compound

A tin compound can be used as a modification agent in the present invention. Given as examples of the tin compound are tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostanyl)ethane, 1,2-bis(methyldichlorostanyl)ethane, 1,4-bis(trichlorostanyl)butane, 1,4-bis(methyldichlorostanyl)butane, ethyltintristearate, butyltintrisoctanoate, butyltintrisstearate, butyltintrislaurate, dibutyltinbisoctanoate, dibutyltinbisstearate, dibutyltinbislaurate, and the like.

These tin compounds can be used either individually or in combinations of two or more.

Modification using said modification agent is preferably carried out by adding the modification agent when the polymerization conversion rate reaches 90% to 100% in the polymerization reaction to manufacture the copolymer rubber (A). Of course, the modification agent may be added intermittently or continuously during the polymerization reaction before the polymerization conversion rate reaches 90%.

The amount of the above-mentioned modification agents to be added is from 0.05 to 5 equivalent, and preferably from 0.1 to 1.5 equivalent of halogen atom, phenoxy group, or ester group for one gram atom of an alkali metal in the organic alkali metal compound required for the polymerization in the manufacture of the copolymer rubber (A). Modification of the copolymer rubber (A') with these modification agents either causes fillers such as silica to bond with the copolymer rubber or creates an electronic interaction between them, which helps fillers homogeneously disperse in the copolymer rubber (A').

The copolymer rubber (A) and the copolymer rubber (A') may be called collectively as the "copolymer rubber (A)" in the description below.

2. Extender Oil (B)

Any extensible oils and softening agents commonly used for diene-type rubbers can be used without any specific limitations for extending the copolymer rubber (A) in the preparation of the oil-extended rubber of the present invention. Mineral oil-type extensible oils are given as a preferable example.

Generally, mineral oil-type extensible oils are mixtures of aromatic-type oil, alicyclic-type oil, and aliphatic-type oil and are classified as an aromatic-type extensible oil, alicyclic-type extensible oil, or aliphatic-type extensible oil. Among these, aromatic-type mineral oil having a viscosity gravity constant (V.G.C. value) of 0.900–1.049 (aromatic oil) and an alicyclic-type mineral oil having a V.G.C. value of 0.850–0.899 (naphthenic oil) are particularly preferable to ensure low hysteresis properties and excellent wet skid resistance. Such extension of the copolymer rubber (A) with extensible oil (B) ensures homogeneous dispersion of fillers such as carbon black and silica in the copolymer rubber (A), and remarkably improves processability and various properties of vulcanized products.

The amount of extensible oil used in the present invention is from 10 to 100 parts by weight, preferably from 15 to 80 parts by weight, and more preferably from 20 to 70 parts by weight, for 100 parts by weight of the copolymer rubber (A).

Conventionally known oil extension methods can be used without any specific limitations. A method of adding extensible oil to the polymer solution can be given, for example. This method allows to omit a step of blending the copolymer rubber (A) having a high Mooney viscosity and extensible oil (B), and is thus preferable for ensuring a highly homogeneous blend of the two components. When the extensible oil is added to the polymer solution, the timing of addition should be after termination of polymerization, for example, after the addition of a terminal modification agent or polymerization termination agent. After the addition of extensible oil (B), the target oil-extended rubber is obtained by separating rubber from solvent by a direct drying method or steam stripping, drying the rubber using a vacuum dryer, hot-air dryer, roller, or the like.

II. Rubber Composition

The rubber composition of the present invention can be prepared by adding various diene-type rubbers other than the copolymer rubber (A) (hereinafter may be simply called "diene-type rubbers") and various additives to the oil extended rubber prepared as mentioned above. The rubber composition thus obtained is molded into a desired configuration and vulcanized to obtain vulcanized rubber. Each components for the composition will now be described in more detail.

1. Oil Extended Rubber

The rubber composition of the present invention comprises the oil extended rubber thus prepared in an amount of 30 to 50 wt % as a rubber component.

2. Diene-type Rubber

Given as the diene-type rubbers which are optionally used in the present invention are at least one rubber components selected from the group consisting of copolymer rubbers of a conjugated diolefin and an aromatic vinyl compound other than the above-mentioned copolymer rubbers (A) or (A'), cis-1,4-isoprene rubber, natural rubber, 3,4-isoprene rubber, styrene/butadiene copolymer rubber, styrene/isoprene/butadiene copolymer rubber, cis-1,4-butadiene rubber, trans-1,4-butadiene rubber, low to high vinyl butadiene rubbers (having a vinyl content of 10–90%), acrylonitrile/butadiene copolymer rubber, and chloroprene rubber. Of these, styrene-butadiene rubber, natural rubbers, polyisoprene rubber, and polybutadiene rubber are preferable. It is desirable that the diene-type rubbers have a Mooney viscosity (ML 1+4, 100° C.) in the range from 20 to 200, and preferably from 25 to 150.

The diene-type rubbers may be added in an amount to satisfy the amount of the above-mentioned conjugated diolefin copolymer rubbers (which is 30 wt % or more, and preferably 50 wt % or more of the total rubber components), specifically, the amount of the diene-type rubbers is less than 70 wt %, and preferably less than 50 wt % of the total rubber components. The addition of the diene-type rubbers in the above range ensures manufacturing of the rubber composition of the present invention at a low cost without substantially impairing its characteristics.

3. Fillers (Reinforcing Agents)

Carbon black, silica, carbon-silica dual-phase-filler, clay, calcium carbonate, magnesium carbonate, and the like can be given as examples of the fillers (reinforcing agents) which can be added to the rubber composition of the present invention. Of these, the combined use of carbon black and silica, the use of carbon-silica dual-phase-fillers alone, or the combined use of carbon-silica dual-phase-filler and carbon black and/or silica are preferable.

(1) Carbon Black

Carbon black manufactured by a furnace method and having a nitrogen adsorption specific surface area of 50–200 $m^2/g$ and DBP oil absorption of 80–200 ml/100 g, for example, FEF, HAF, ISAF, or SAF class carbon black, is preferable. High agglomeration type carbon black is particularly preferable.

Carbon black is added in an amount from 2 to 100 parts by weight, and preferably from 5 to 95 parts by weight, for 100 parts by weight of the total of copolymer rubber (A) and diene-type rubbers.

(2) Silica

As silica, wet process silica, dry process silica, and synthetic silicate-type silica are given, for example. Silica with a small particle diameter exhibits a high reinforcing effect. Small diameter, high agglomeration-type silica (i.e. that having a large surface area and high oil absorptivity) exhibits excellent dispensability in rubber, desirable properties, and superior processability. An average particle diameter of silica, in terms of a primary particle diameter, is preferably from 5 to 60 $\mu$m, and more preferably from 10 to 35 $\mu$m.

Moreover, the specific surface area of the silica particles (measured by the BET method) is preferably from 45 to 280 $m^2/g$.

Silica is added in an amount from 30 to 100 parts by weight, and preferably from 30 to 95 parts by weight, for 100 parts by weight of the total of copolymer rubber (A) and diene-type rubbers.

Carbon black and silica may be added together, in which case the total amount of carbon black and silica added is from 30 to 100 parts by weight, and preferably from 30 to 95 parts by weight, for 100 parts by weight of the total of copolymer rubber (A) and diene-type rubbers.

If carbon black and silica are added to the oil extended rubber in the amount of above range, these fillers exhibiting a reinforcing effect can be homogeneously dispersed in the rubber, producing a rubber composition with excellent rolling and extruding processability and vulcanized products exhibiting various excellent properties such as favorable hysteresis loss properties, rolling resistance, improved wet skid resistance, abrasion resistance, and breaking strength.

(3) Carbon-silica Dual-phase-filler

Carbon-silica dual-phase-filler may be used either independently or in combination with carbon black and/or silica in the present invention. Carbon-silica dual-phase-filler can exhibits the same effects as those obtained by the combined use of carbon black and silica, even in the case where this is added alone.

Carbon-silica dual-phase-filler is so called silica-coating-carbon black made by coating silica over the surface of carbon black, and is commercially available under the trademark CRX2000, CRX2002, or CRX2006 (products of Cabot Co.).

Carbon-silica dual-phase-filler is added in an amount from 30 to 100 parts by weight, and preferably from 30 to 95 parts by weight, for 100 parts by weight of the total of copolymer rubber (A) and diene-type rubbers.

In the present invention, carbon-silica dual-phase-filler can be used in combinations with other fillers. Other fillers which can be used together with carbon-silica dual-phase-filler include, but are not limited to, carbon black, silica, clay, calcium carbonate, and magnesium carbonate, for example. Of these fillers, use of carbon black and silica, either individually or in combination, is preferable. These other fillers is added in an amount (as a total of such fillers and carbon-silica dual-phase-filler) from 30 to 100 parts by weight, and preferably from 30 to 95 parts by weight, for 100 parts by weight of the total of copolymer rubber (A) and diene-type rubbers.

(4) Silane Coupling Agent

It is preferable to add a silane coupling agent, when silica or carbon-silica dual-phase-filler is used as a filler. The amount of a silane coupling agent added is from 1 to 20 parts by weight, and preferably from 5 to 15 parts by weight, for 100 parts by weight of the total amount of silica and/or carbon-silica dual-phase-filler.

A silane coupling agent which has both a functional group reactive with silica surface such as an alkoxysilyl group and a functional group reactive with a carbon-carbon double bond of rubber such as polysulfide group, mercapto group, or epoxy group in the molecule is preferable. For example, bis-(3-triethoxysilylpropyl)tetrasulfide, bis-(3-triethoxysilylpropyl)disulfide, bis-(2-triethoxysilylethyl) tetrasulfide, bis-(2-triethoxysilylethyl)disulfide, 3-mercaptopropyltrimethoxysilane, 3-triethoxysilylpropyl-N,N-dimethylthiocarbamoyltetrasulfide, 3-triethoxysilylpropylbenzothiazole tetrasulfide, and the like can be given. The use of such a silane coupling agent increases the reinforcing effect brought about by the combined use of carbon black and silica or the use of carbon-silica dual-phase-filler as fillers.

4. Vulcanizing Agent

A vulcanizing agent is added in an amount from 0.5 to 10 parts by weight, and preferably from 1 to 6 parts by weight, for 100 parts by weight of the total of copolymer rubber (A) and diene-type rubbers.

Sulfur is a typical vulcanizing agent. Sulfur-containing compounds, peroxides, and the like can be given as other examples of vulcanizing agent.

A vulcanizing accelerator of sulfene amide-type, guanidine-type, or thiuram-type, for example, can be used together with a vulcanizing agent, as required. Other additives such as zinc white, vulcanization auxiliaries, aging preventives, processing adjuvants, and the like may be optionally added.

5. Preparation of the Composition

The rubber composition of the present invention can be prepared by kneading the above-described oil extended rubber, diene-type rubber, fillers (carbon black, silica, carbon-silica dual-phase-filler, etc.), silane coupling agents, and other additives in a kneader at 140 to 180° C. After cooling, vulcanizing agents such as sulfur, vulcanizing accelerators, and the like are added, and the resulting mixture is blended using a Banbury mixer or mixing roller mill, formed into a desired shape, and vulcanized at 140 to 180° C., thereby obtaining a vulcanized rubber product with any optional shape.

6. Application of the Composition

Because the vulcanized rubber obtained from the rubber composition of the present invention exhibits extremely excellent low rolling resistance and superior wet skid performance, the rubber composition of the present invention can be suitably used for tires such as treads, side walls, and carcasses, as well as other industrial products such as belts, hosees, vibration-proof rubber, and footwear.

The present invention will be explained in more detail by way of examples, which are not intended to be limiting of the present invention.

EXAMPLES

Various measuring methods used in the examples are as follows.

(1) Vinyl content in the conjugated diolefin part: Determined by IR absorption spectrum (Morello method).

(2) Bonded styrene content: A calibration curve was prepared by IR absorption spectrum.

(3) A single chain aromatic vinyl compound unit (a unit with an aromatic vinyl compound linked singly) and a long chain aromatic vinyl compound unit (a unit in which 8 or more aromatic vinyl compounds are linked): Ozonolysis-gel permeation chromatography method developed by Tanaka et al. (Polymer, Vol. 22, Pages 1721–1723 (1981)).

(4) Molecular weight distribution (Mw/Mn): Determined from the ratio of polystyrene-reduced weight average molecular weight (Mw) and number average molecular weight (Mn) which were measured by gel permeation chromatograph (244-type GPC, manufactured by Waters Co.).

(5) Mooney viscosity: Mooney viscosity was measured according to JIS K6300 with a preheating time of one minute and a rotor operation time of 4 minutes at a temperature of 100° C.

(6) Amino acid content: Quantitatively measured by the acid-base titration method in an organic solvent using perchloric acid-acetic acid solution described by Robert. T. Keen, James. S. Fritz (J. Anal. Chem., Vol. 24, page 564 (1952)). A calibration curve was prepared from a solution of tri-n-octyl amine with a known concentration, using chloroform as a solvent to dissolve the samples and methyl violet as a titration indicator.

(7) Modification efficiency with an alkoxysilane compound (%): Quantitatively determined from the calibration curve which was prepared by Si—C bond absorption in the vicinity of 1,160 cm$^{-1}$ by IR spectrum. To determine the modification efficiency with an alkoxysilane compound (%), the value was divided by the number average molecular weight (Mn) measured by GPC, because measured value is the amount of the Si—C bond per unit weight.

(8) Terminal modification efficiency of polymer with di-n-octyltin dichlorite and silicon tetrachloride (%): A peak area ratio of coupled polymers determined by gel permeation chromatograph (244-type GPC, manufactured by Waters Co.) was taken as the terminal modification efficiency.

(9) Evaluation of properties of vulcanized products: Compositions according to the formulation shown in Table 2 were kneaded in a 250 cc laboratory plast-mill, vulcanized at 145° C. for a prescribed period of time. Properties (a)–(d) were measured using the vulcanized products.

(a) 300% Modulus: Measured according to JIS K6301

(b) tan δ (50° C.) and at tan δ (60° C.): Measured using a dynamic spectrometer manufactured by Rheometrix Co. (U.S.A) under the conditions of tensile dynamic strain of 1% and a frequency of 10 Hz at 50° C. The larger the index, the better the rolling resistance. tan δ (0° C.) was measured using the same equipment at tensile dynamic strain of 0.1% and a frequency of 10 Hz at 0° C. The larger the index, the better the wet skid resistance.

(c) Lanbourn abrasion index: The index was expressed by the wear amount at 25% abrasion loss, measured using a Lanbourn-type abrader at room temperature. The larger the index, the better the wear resistance is.

(d) Processability
  (i) Kneading processability: Evaluated by the amount of residual fillers at 3 minutes after start of kneading.
  (ii) Winding to rollers and texture extruded products: Conditions of settling, gloss, and appearance were evaluated by naked eye observations.

<Synthesis of Oil-extended Copolymer Rubbers and Their Structure>

Example 1

(Synthesis of Polymer A)

A 20 l autoclave reaction vessel equipped with a stirrer and jacket was sufficiently replaced with nitrogen, and continuously charged with monomers (1,3-butadiene containing 100 ppm of 1,2-butadiene: 19.5 g/min, styrene: 10.5 g/min), solvents (cyclohexane: 150 g/min, tetrahydrofuran: 0.70 g/min), and catalysts (di-n-butylamine: 0.0136 g/min, n-butyl lithium: 0.0075 g/min) while controlling the temperature at 70° C. Methyltriphenoxysilane was continuously fed at a rate of 0.117 mmol/min to the outlet at the top of the first reactor and introduced to the second reactor which was connected to the first reactor, thereby effecting the modification reaction. At the outlet of the second reactor, di-tert-butyl-p-cresol was added in an amount of 0.7 part by weight for 100 parts by weight of rubber. After polymerization, high aromatic oil (viscosity specific gravity constant: V.G.C.= 0.963) was added to the polymer solution in an amount of 37.5 parts by weight for 100 parts by weight of rubber, the solvents were removed by steam stripping, rubber was dried by a heat roll at 115° C., thereby obtaining polymer A. The results of analysis of polymer A are shown in Table 6.

Example 2
(Synthesis of Polymer B)

Polymer B was obtained in the same manner using the same formulation as in Example 1, except that vinylbenzyldimethylamine, which is a vinyl compound having a tertiary amino group, was fed as an amine compound at a rate of 0.0170 g/min instead of feeding di-n-butylamine at a rate of 0.0136 g/min. The results of analysis of polymer B are shown in Table 6.

Example 3
(Synthesis of Polymer C)

Polymer C was obtained in the same manner using the same formulation as in Example 1, except that pyrrolidine (tetramethyleneimine) was fed as a secondary amine at a rate of 0.0075 g/min instead of feeding di-n-butylamine at a rate of 0.0136 g/min. The results of analysis of polymer C are shown in Table 6.

Example 4
(Synthesis of Polymer D)

Polymer D was obtained in the same manner using the same formulation as in Example 1, except that N,N-dimethyl-o-toluidine, which is a compound having a tertiary amino group, was fed as an amine compound at a rate of 0.0142 g/min instead of feeding di-n-butylamine at a rate of 0.0136 g/min. The results of analysis of polymer D are shown in Table 6.

Example 5–7
(Synthesis of Polymers E–G)

Polymers E–G were obtained in the same manner as in Example 3, except that the feeding rates of pyrrolidine and n-butyl lithium were changed as shown in Table 2 and the kinds and amounts of the modification agents added to the outlet at top of the first reactor were changed as shown in Table 3. Naphthenic oil with a viscosity specific gravity constant (V.G.C. value) of 0.838 was added to the polymer G as extensible oil. The results of analysis of polymers E–G are shown in Table 6.

Example 8
(Synthesis of Polymer H)

A polymer was prepared in the same manner as in Example 3, provided that the polymerization was carried out without the addition of pyrrolidine as a secondary amine compound and N,N,N,N-tetraethylaminobenzophenone was added to the outlest of the top of first reactor instead of methyltriphenoxysilane. The results of analysis of polymer H are shown in Table 6. The amino group content of polymer H was 0.0057 mmol/g polymer in spite of the use of a polymerization initiator which does not include an amino group, because of the use of an amino group-containing compound as a terminal modification agent.

Comparative Example 1
(Synthesis of Polymer I, Not Extended with Oil)

Polymer I was obtained in the same manner as in Example 3, except that the high aromatic oil with a V.G.C. value of 0.963 was not added. The results of analysis of polymer I are shown in Table 6.

Comparative Example 2
(Synthesis of Polymer J, without an Amino Group)

Comparative Example 3
(Synthesis of Polymer K, with a Small Amino Group Content)

Polymers (polymer J and Polymer K) were prepared in the same manner as in Example 3, provided that the amount of pyrrolidine added as a secondary amine compound and methyltriphenoxysilane added to the outlet of the top of first reactor were respectively as shown in Table 2 and Table 3. The results of analysis of polymer J and polymer K are shown in Table 6. The amino group content of each polymer was respectively 0 mmol and 0.0022 mmol.

Example 9
(Synthesis of Polymer L)

The polymerization was carried out in the same manner as in Example 3 in the first reactor. In addition, the second reactor was continuously charged with monomers (1,3-butadiene: 9.8 g/min, styrene: 5.3 g/min) and catalysts (pyrrolidine: 0.0016 g/min, n-butyl lithium: 0.0019 g/min) while controlling the temperature at 70° C. Methyltriphenoxysilane was continuously added to the outlet at the top of second reactor at a rate of 0.117 mmol/min and introduced into a third reactor connected with the second reactor, wherein a coupling reaction was carried out. The reaction product was processed in the same manner as in Example 3 to obtain polymer L. The results of analysis of polymer L are shown in Table 6.

Example 10
(Synthesis of Polymer M)

A 5 l autoclave reaction vessel of which the internal atmosphere was replaced by nitrogen was charged with 2,500 g of cyclohexane, 27.0 g of tetrahydrofuran, 175 g of styrene, 250 g of 1,3-butadiene, and 0.12 g of pyrrolidine. After adjusting the temperature of the content in the reaction vessel to 40° C., 0.13 g of n-butyl lithium was added to initiate the polymerization. After start of the polymerization, color of the reaction solution began to changed from yellow to a reddish color, whereupon 75 g of 1,3-butadiene was continuously charged at a rate to keep the solution from becoming reddish. The maximum polymerization temperature reached 85° C. After the polymerization conversion rate reached 100%, 1.95 mmol of methyltriphenoxysilane was added and the modification reaction was carried out for 5 minutes. After polymerization, 2,6-di-tert-butyl-p-cresol was added and 187.5 g of high aromatic oil (37.5 parts by weight for 100 parts by weight of rubber) was further added, the solvents were removed by steam stripping, and rubber was dried by a heat roll at 115° C., thereby obtaining polymer M. The results of analysis of polymer M are shown in Table 6.

Example 11
(Synthesis of Polymer N)

Polymer N was obtained in the same manner as in Example 10, except that N,N,N',N'-tetraethylaminobenzophenone was used as a terminal modification agent instead of methylphenoxysilane. The results of analysis of polymer N are shown in Table 6.

Example 12
(Synthesis of Polymer O)

Polymer O was prepared in the same manner as in Example 10, except that the polymerization reaction was carried out by adding 0.054 g of potassium dodecylbenzenesulfonate to the reaction mixture in advance. The results of analysis of polymer O are shown in Table 6.

Example 13
(Synthesis of Polymer P)

Polymer N was obtained in the same manner as in Example 10, provided that 0.15 g of pyrrolidine and 0.16 g of n-butyl lithium were not added, the polymerization was initiated using as a polymerization initiator 1,4-dilithio butane which had been previously prepared in a separate reaction vessel (a 100 ml pressure resistant bottle, replaced with nitrogen), and N,N,N',N'-tetraethylaminobenzophenone was added instead of methyltriphenoxysilane after the polymerization conversion rate reached 100%. The results of analysis of polymer P are shown in Table 6. The amino group content of polymer P was 0.0090 mmol/g polymer in spite of the use of a polymerization initiator which does not include an amino group, because of the use of an amino group-containing compound as a terminal modification agent. Batch polymerization conditions of Examples 10 to 13 are shown in Table 4 and Table 5.

Examples 14–15
(Synthesis of Polymers Q, R, and T)

Polymers Q, R, and T were obtained in the same manner as in Example 3, except that the feeding rates of tetrahydrofuran, 1,3-butadiene, styrene, pyrrolidine, and n-butyl lithium were changed as shown in Table 2 and the kinds and amounts of the modification agents added to the outlet at top of the first reactor were changed as shown in Table 3. The results of analysis of polymers Q, R, and T are shown in Table 6. Naphthenic oil with a viscosity specific gravity constant (V.G.C. value) of 0.838 was added to the polymer R as extensible oil.

Comparative Example 4 and 5
(Synthesis of Polymers S and U, Not Extended with Oil)

Polymers S and U were obtained in the same manner as in Examples 14 and 16, except that the high aromatic oil with a V.G.C. value of 0.963 was not added to the polymer solution. The results of analysis of polymers S and U are shown in Table 6.

Comparative Example 6
(Synthesis of Polymer V)

Polymer V was obtained in the same manner as in Example 3, except that the feeding rates of tetrahydrofuran, 1,3-butadiene, styrene, pyrrolidine, and n-butyl lithium were changed as shown in Table 2 and the kinds and amounts of the modification agents added to the outlet at top of the first reactor were changed as shown in Table 3. The results of analysis of polymer V are shown in Table 6. The Polymer V showed a low amino acid content of 0.0021 mmol.

<Evaluation of Properties of Vulcanized Products of Oil Extended Rubber>

(1) Carbon Black-silica Mixture (Evaluation Tests 1–22)

Vulcanized products were prepared from styrene-butadiene copolymer and other additives according to the formulation C (carbon black-silica mixture) in Table 1 to evaluate their properties. Properties of 300% modulus, tan δ (0° C.), tan δ (50° C.), and Lanbourn abrasion were grouped into three groups according to similarity of polymer microstructure and styrene contents, and represented by the Evaluation Test 3 (Polymer C), Evaluation Test 17 (Polymer Q), and Evaluation Test 20 (Polymer T), for which the index of evaluation of these properties were assumed to be 100. The larger the index, the better the properties. Polymers used for the evaluation and the results of property evaluation are shown in Table 7.

TABLE 1

| Components | Formulation | | | |
|---|---|---|---|---|
| | A | B | C | D |
| Natural rubber | 20 | 20 | 20 | 20 |
| (S) SBR | 80 | 80 | 80 | 80 |
| Extensible oil | 37.5 | 37.5 | 37.5 | 37.5 |
| Carbon black | 75 | | 30 | |
| Particulate silica | | 75 | 45 | |
| Carbon-silica dual-phase-filler | | | | 75 |
| Silane coupling agent | | 6 | 4 | 2 |
| Stearic acid | 2 | 2 | 2 | 2 |
| Zinc oxide | 3 | 3 | 3 | 3 |
| Aging preventives (IPPD) | 1 | 1.5 | 1.5 | 1.5 |
| Vulcanization accelerator | | | | |
| DPG | | 1.5 | 0.7 | 0.7 |
| MBTS | 1 | | | |
| BBS | 0.5 | | | |
| CBS | | 1.2 | 1.5 | 1.5 |
| Sulfur | 1.5 | 1.5 | 1.5 | 1.5 |

A: Carbon black-containing formulation
B: Silica-containing formulation
C: Carbon black/silica mixture formulation
D: Carbon-silica dual-phase-filler formulation
(S) SBR: For (S) SBR previously extended with oil, the amount without oil is indicated
Extensible oil: For (S) SBR previously extended with oil, the total of the amount of oil continined in the oil extended rubber and the amount of oil added to the composition is indicated.
Carbon black: Diablack N339, manufactured by Mitsubishi Chemical Corp.
Particulate silica: Nipseal AQ, manufactured by Japan Silica Co.
Carbon-silica dual-phase-fillers: CRX 2 002, manufactured by Cabbot Co.
Silane coupling agent: bis-(3-triethoxysilylpropyl) tetrasulfide
IPPD: N-phenyl-N'-isopropyl-p-phenylenediamine
DPG: Diphenylguanidine
MBTS: Dibenzothiazyl disulfide
BBS: N-tert-butyl-2-benzothiazolylsulfene amide
CBS: N-cyclohexyl-2-benzothiazilsulfene amide

TABLE 2

| | | Continuous polymerization conditions | | | | | |
|---|---|---|---|---|---|---|---|
| | | Amine compound | | | | | |
| | Polymer Kind | | Amount mg/min | n-BuLi mg/min | Tetrahydrofuran g/min | 1,3-butadiene g/min | Styrene g/min |
| Example 1 | A | Di-n-butylamine | 13.6 | 7.5 | 0.70 | 19.5 | 10.5 |
| Example 2 | B | Vinyl benzyl dimethylamine | 17.0 | 7.5 | 0.70 | 19.5 | 10.5 |
| Example 3 | C | Pyrrolidine | 7.5 | 7.5 | 0.70 | 19.5 | 10.5 |

TABLE 2-continued

| | | Continuous polymerization conditions | | | | | |
|---|---|---|---|---|---|---|---|
| | | Amine compound | | n-BuLi | Tetrahydrofuran | 1,3-butadiene | Styrene |
| | Polymer | Kind | Amount mg/min | mg/min | g/min | g/min | g/min |
| Example 4 | D | N,N-dimethyl-o-toluidine | 14.2 | 7.5 | 0.70 | 19.5 | 10.5 |
| Example 5 | E | Pyrrolidine | 7.5 | 7.5 | 0.70 | 19.5 | 10.5 |
| Example 6 | F | Pyrrolidine | 16.5 | 16.5 | 1.54 | 19.5 | 10.5 |
| Example 7 | G | Pyrrolidine | 16.5 | 16.5 | 1.54 | 19.5 | 10.5 |
| Example 8 | H | None | — | 7.5 | 0.70 | 19.5 | 10.5 |
| Comparative Example 1 | I | Pyrrolidine | 7.5 | 7.5 | 0.70 | 19.5 | 10.5 |
| Comparative Example 2 | J | None | — | 7.5 | 0.70 | 19.5 | 10.5 |
| Comparative Example 3 | K | Pyrrolidine | 4.6 | 7.5 | 0.70 | 19.5 | 10.5 |
| Example 9 | L | Pyrrolidine | 7.5 | 7.5 | 0.70 | 19.5 | 10.5 |
| | | Pyrrolidine | 1.6 | 1.9 | | 9.8 | 5.3 |
| Example 14 | Q | Pyrrolidine | 7.5 | 7.5 | 0.24 | 21.0 | 9.0 |
| Example 15 | R | Pyrrolidine | 16.5 | 16.5 | 0.52 | 21.0 | 9.0 |
| Comparative Example 4 | S | Pyrrolidine | 7.5 | 7.5 | 0.24 | 21.0 | 9.0 |
| Example 16 | T | Pyrrolidine | 7.5 | 7.5 | 1.00 | 24.0 | 6.0 |
| Comparative Example 5 | U | Pyrrolidine | 7.5 | 7.5 | 1.00 | 24.0 | 6.0 |
| Comparative Example 6 | V | Pyrrolidine | 4.5 | 7.5 | 1.00 | 24.0 | 6.0 |

TABLE 3

| | | Continuous polymerization conditions | | |
|---|---|---|---|---|
| | | Modification agent | | |
| | Polymer | kind | mmol/min | Remarks |
| Example 1 | A | Methyltriphenoxysilane | 0.117 | |
| Example 2 | B | Methyltriphenoxysilane | 0.117 | |
| Example 3 | C | Methyltriphenoxysilane | 0.117 | |
| Example 4 | D | Methyltriphenoxysilane | 0.117 | |
| Example 5 | E | None | — | |
| Example 6 | F | Silicon tetrachloride | 0.064 | |
| Example 7 | G | Di-n-octyltin dichloride | 0.129 | |
| Example 8 | H | N,N,N',N'-tetraethyl-aminobenzophenone | 0.117 | |
| Comparative Example 1 | I | Methyltriphenoxysilane | 0.117 | No extensible oil |
| Comparative Example 2 | J | None | — | No amino groups |
| Comparative Example 3 | K | Methyltriphenoxysilane | 0.117 | A few amino groups |
| Example 9 | L | — | — | First reactor |
| | | Methyltriphenoxysilane | 0.117 | Second reactor |
| Example 14 | Q | Methyltriphenoxysilane | 0.117 | |
| Example 15 | R | Di-n-octyltin dichloride | 0.129 | |
| Comparative Example 4 | S | Methyltriphenoxysilane | 0.117 | No extensible oil |
| Example 16 | T | Methyltriphenoxysilane | 0.117 | |
| Comparative Example 5 | U | Methyltriphenoxysilane | 0.117 | No extensible oil |
| Comparative Example 6 | V | Methyltriphenoxysilane | 0.117 | A few amino groups |

TABLE 4

Batch polymerization conditions

Components added prior to polymerization

| | | Amine compound | | n-BuLi | Potassium dodecyl benzenesulfonate | Tetrahydrofuran | 1,3-butadiene | Styrene |
|---|---|---|---|---|---|---|---|---|
| | Polymer | Kind | g | g | mg | g | g | g |
| Example 10 | M | Pyrrolidine | 0.12 | 0.13 | — | 27.0 | 250 | 175 |
| Example 11 | N | Pyrrolidine | 0.12 | 0.13 | — | 27.0 | 250 | 175 |
| Example 12 | O | Pyrrolidine | 0.12 | 0.13 | 54 | 27.0 | 250 | 175 |
| Example 13 | P | None | — | * | — | 27.0 | 250 | 175 |

*1,4-dilithio butane: 0.12 g

TABLE 5

Batch polymerization conditions

| | | Components added afterward | | Polymerization temperature | | Modification agent | |
|---|---|---|---|---|---|---|---|
| | | 1,3-butadiene | Styrene | Initial temperature | Maximum temperature | | |
| | Polymer | g | g | °C. | °C. | Kind | mmol |
| Example 10 | M | 75 | — | 35 | 85 | Methyltriphenoxysilane | 1.95 |
| Example 11 | N | 75 | — | 35 | 85 | N,N,N',N'-tetraethylamino benzophenone | 1.95 |
| Example 12 | O | 75 | — | 35 | 85 | Methyltriphenoxysilane | 1.95 |
| Example 13 | P | 75 | — | 35 | 85 | N,N,N',N'-tetraethylamino benzophenone | 3.51 |

TABLE 6

Structure of oil extended rubber

| Polymer | Amino group content (mmol/g) | Terminal modification efficiency (%) | Vinyl content (%) | Styrene content (%) | ST1 (*1) (%) | ST > 8 (*2) (%) | Mw/Mn | Mooney viscosity of raw rubber | Mooney viscosity (oil-extended) | Remarks |
|---|---|---|---|---|---|---|---|---|---|---|
| A | 0.0036 | 52 | 43 | 33 | 64 | 0.5 | 2.2 | 95 | 40 | |
| B | 0.0037 | 55 | 42 | 34 | 65 | 0.5 | 2.2 | 95 | 40 | |
| C | 0.0036 | 58 | 42 | 34 | 64 | 0.5 | 2.1 | 94 | 40 | |
| D | 0.0035 | 52 | 43 | 35 | 64 | 0.5 | 2.2 | 96 | 40 | |
| E | 0.0036 | 0 | 42 | 34 | 63 | 0.5 | 1.9 | 95 | 40 | |
| F | 0.0080 | 60 | 43 | 35 | 64 | 0.5 | 2.3 | 96 | 40 | |
| G | 0.0079 | 61 | 43 | 35 | 64 | 0.5 | 2.2 | 97 | 41 | |
| H | 0.0057 | 65 | 43 | 35 | 66 | 0.4 | 2.0 | 95 | 40 | |
| I | 0.0036 | 58 | 42 | 34 | 64 | 0.5 | 2.1 | 95 | 95 | Non-oil-extended |
| J | 0 | 0 | 43 | 34 | 64 | 0.5 | 2.1 | 96 | 40 | No amino groups |
| K | 0.0022 | 57 | 45 | 34 | 64 | 0.5 | 2.1 | 93 | 40 | A few amino groups |
| L | 0.0036 | 50 | 43 | 33 | 56 | 0.4 | 3.2 | 94 | 40 | |
| M | 0.0036 | 60 | 42 | 35 | 57 | 1.5 | 1.4 | 95 | 40 | |
| N | 0.0036 | 0 | 42 | 34 | 64 | 0.5 | 1.1 | 95 | 40 | |
| O | 0.0036 | 45 | 43 | 35 | 41 | 0.9 | 1.4 | 96 | 40 | |
| P | 0.0090 | 51 | 43 | 35 | 56 | 1.8 | 1.7 | 95 | 40 | |
| Q | 0.0036 | 57 | 35 | 33 | 72 | 0.5 | 2.1 | 96 | 40 | |
| R | 0.0079 | 58 | 31 | 35 | 69 | 0.6 | 2.2 | 95 | 40 | |
| S | 0.0036 | 57 | 35 | 33 | 72 | 0.5 | 2.1 | 98 | 98 | Non-oil-extended |
| T | 0.0036 | 56 | 60 | 20 | 60 | 0.5 | 2.3 | 96 | 40 | |
| U | 0.0036 | 56 | 60 | 20 | 60 | 0.5 | 2.3 | 97 | 97 | Non-oil-extended |
| V | 0.0021 | 59 | 60 | 20 | 64 | 0.5 | 2.1 | 95 | 40 | A few amino groups |

*ST1: Percentage of single styrene chain units per total styrenes
*ST > 8: Percentage of long chain units (8 or more styrenes) per total styrenes

TABLE 7

Evaluation of vulcanized products

| Evaluation Test | Polymer | Processability Kneading processability | Winding to rollers/texture extruded products | 300% modulus (index) | tan δ 0° C. (index) | tan δ 50° C. (index) | Lanbourn wear (index) | Remarks |
|---|---|---|---|---|---|---|---|---|
| 1 | A | ⊚ | ○ | 100 | 101 | 98 | 99 | |
| 2 | B | ⊚ | ○ | 99 | 102 | 98 | 98 | |
| 3 | C | ⊚ | ○ | 100 | 100 | 100 | 100 | |
| 4 | D | ⊚ | ○ | 98 | 103 | 98 | 100 | |
| 5 | E | ○ | ○ | 104 | 96 | 96 | 100 | |
| 6 | F | ○ | ○ | 105 | 97 | 96 | 95 | |
| 7 | G | ⊚ | ⊚ | 99 | 97 | 102 | 95 | |
| 8 | H | ○ | ○ | 98 | 95 | 97 | 95 | |
| 9 | I | x | x | 94 | 98 | 90 | 90 | Non-oil-extended |
| 10 | J | ○ | ○ | 96 | 95 | 86 | 91 | No amino groups |
| 11 | K | ⊚ | ○ | 95 | 96 | 92 | 101 | A few amino groups |
| 12 | L | ⊚ | ○ | 97 | 101 | 94 | 93 | |
| 13 | M | ○ | ○ | 98 | 98 | 97 | 102 | |
| 14 | N | ○ | Δ | 94 | 98 | 96 | 96 | |
| 15 | O | ○ | ⊚ | 105 | 101 | 96 | 115 | |
| 16 | P | ○ | ○ | 98 | 100 | 99 | 98 | |
| 17 | Q | ○ | ○ | 100 | 100 | 100 | 100 | |
| 18 | R | ⊚ | ⊚ | 99 | 96 | 98 | 95 | |
| 19 | S | x | Δ | 94 | 98 | 91 | 89 | Non-oil-extended |
| 20 | T | ○ | ○ | 100 | 100 | 100 | 100 | |
| 21 | U | x | Δ | 94 | 99 | 88 | 92 | Non-oil-extended |
| 22 | V | ⊚ | ○ | 96 | 95 | 92 | 102 | A few amino groups |

The following remarks apply to the results shown in Table 7.

From the results of Evaluation Tests 1–4 (Polymers A–D), Evaluation Test 17 (Polymer Q), and Evaluation Test 20 (Polymer T), it can be seen that the oil extended rubbers of the present invention with amino groups introduced in the terminals and modified with an alkoxysilyl group-containing compound exhibit excellent processability, and well-balanced various other properties such as wet skid resistance (tan δ, 0° C.), low hysteresis loss properties (tan δ, 50° C.), and abrasion resistance. Comparison of Evaluation Test 5 (Polymer E) and Evaluation Test 10 (Polymer J) indicates that introduction of amino groups in the polymer terminals of the oil extended rubber of the present invention ensures well-balanced wet skid resistance (tan δ, 0° C.), low hysteresis loss properties (tan δ, 50° C.), and abrasion resistance. Comparison of Evaluation Test 3 (Polymer C) and Evaluation Test 11 (Polymer K), as well as comparison of Evaluation Test 20 (Polymer T) and Evaluation Test 22 (Polymer V) indicates that introduction of amino groups in the polymer terminals of the oil extended rubber of the present invention in a ratio of 0.0025 mmol/g polymer is insufficient in obtaining an improved balance of properties among wet skid resistance (tan δ, 0° C.), low hysteresis loss properties (tan δ, 50° C.), and abrasion resistance. Comparison of Evaluation Test 3 (Polymer C) and Evaluation Test 9 (Polymer I), comparison of Evaluation Test 17 (Polymer Q) and Evaluation Test 19 (Polymer S), and comparison of Evaluation Test (Polymer T) and Evaluation Test 21 (Polymer U) indicates that prior oil extension of the oil extended rubber of the present invention ensures excellent processability, which contributes to improvement of various properties.

(2) Evaluation of Properties of Oil Extended Rubbers with Different Compositions Vulcanized products prepared from combinations of different polymers (Polymers C, E, I, and J) and compositions A (carbon black formulation), B (silica formulation), C (carbon black-silica mixture formulation), and D (carbon-silica dual-phase-fillers formulation) were evaluated. The results of property evaluation are shown in Table 8.

TABLE 8

Evaluation of compositions

| Evaluation Test | Polymer | Formulation | Processability Kneading processability | Winding to rollers/texture extruded products | 300% modulus (index) | tan δ 0° C. (index) | tan δ 50° C. (index) | Lanbourn wear (index) | Remarks |
|---|---|---|---|---|---|---|---|---|---|
| 23 | C | A | ⊚ | ○ | 100 | 100 | 100 | 100 | |
| 24 | E | A | ○ | ○ | 98 | 100 | 98 | 99 | |
| 25 | I | A | x | Δ | 95 | 102 | 93 | 93 | Non-oil-extended |
| 26 | J | A | ○ | ○ | 96 | 97 | 92 | 93 | No amino groups |
| 27 | C | B | ⊚ | ○ | 100 | 100 | 100 | 100 | |
| 28 | E | B | ○ | ○ | 104 | 97 | 95 | 95 | |
| 29 | I | B | x | x | 95 | 100 | 89 | 90 | Non-oil-extended |

TABLE 8-continued

Evaluation of compositions

| Evaluation Test | Polymer | Formulation | Processability | | 300% modulus (index) | tan δ 0° C. (index) | tan δ 50° C. (index) | Lanbourn wear (index) | Remarks |
| --- | --- | --- | --- | --- | --- | --- | --- | --- | --- |
| | | | Kneading processability | Winding to rollers/texture extruded products | | | | | |
| 30 | J | B | ○ | ○ | 99 | 97 | 86 | 89 | No amino groups |
| 31 | C | C | ⊙ | ○ | 100 | 100 | 100 | 100 | |
| 32 | E | C | ○ | ○ | 104 | 95 | 96 | 95 | |
| 33 | I | C | x | x | 94 | 98 | 90 | 90 | Non-oil-extended |
| 34 | J | C | ○ | ○ | 96 | 95 | 88 | 90 | No amino groups |
| 35 | C | D | ⊙ | ○ | 100 | 100 | 100 | 100 | |
| 36 | E | D | ○ | ○ | 101 | 99 | 96 | 97 | |
| 37 | I | D | x | Δ | 93 | 101 | 90 | 91 | Non-oil-extended |
| 38 | J | D | ○ | ○ | 97 | 97 | 89 | 91 | No amino groups |

As can be seen from Table 8, all oil extended rubbers with the addition of carbon black, silica, carbon black-silica mixture, or carbon-silica dual-phase-filler exhibit excellent processability and well-balanced wet skid resistance (tan δ, 0° C.), low hysteresis loss properties (tan δ, 50° C.), and abrasion resistance.

The effect of improvement is particularly remarkable in the silica formulation B, carbon black-silica mixture formulation B, and carbon-silica dual-phase-fillers formulation D. In the evaluation results of low hysteresis loss properties (tan δ, 50° C.) and Lanbourn abrasion properties, it is clear that the degree of improvement is larger in compositions using silica formulation B, carbon black-silica mixture formulation B, and carbon-silica dual-phase-fillers formulation D than in compositions using carbon black formulation A. It can also be seen that the use of Polymer I which had not been previously extended with oil impairs processability of the resulting products, giving rise to worsening of various properties.

As described above, the oil extended rubber prepared from the modified copolymer rubber of a diolefin and an aromatic vinyl compound with amino groups on the polymer chain, preferably on the polymer terminals, can ensure homogeneous dispersion of fillers in all cases where either carbon black or silica, or both, is used or a carbon-silica dual-phase-filler is used. As a result, the oil extended rubber can produce vulcanized products exhibiting well-balanced improved properties such as wet skid properties, low hysteresis loss properties, abrasion resistance, and breaking strength, and is useful as a tread material for low fuel consumption tires, large tires, and high performance tires.

Obviously, numerous modifications and variations of the present invention are possible in light of the above teachings. It is therefore to be understood that, within the scope of the appended claims, the invention may be practiced otherwise than as specifically described herein.

What is claimed is:

1. An oil extended rubber comprising 100 parts by weight of (A) an amino group-containing copolymer rubber of a conjugated diolefin and an aromatic vinyl compound which contains bonded amino groups in the amount of 0.0025–0.20 mmol/g polymer, and 10–100 parts by weight of (B) an extensible oil, wherein the copolymer rubber is obtained by copolymerization in a hydrocarbon solvent, has a ratio of weight average molecular weight to number average molecular weight of from 1.3 to 3.0, and contains 60 wt % or more of a single chain aromatic vinyl compound unit consisting of an independently linked aromatic vinyl compound.

2. The oil extended rubber according to claim 1, wherein at least 40 wt % of the copolymer rubber of a conjugated diolefin and an aromatic vinyl compound (A) is a polymer modified by a compound selected from the group consisting of alkoxysilanes represented by the following formula (1), halogen-containing silicon compounds, ketone compounds, and tin compounds:

$$X_n Si(OR)_m R'_{4-(m+n)} \qquad (1)$$

wherein X is a halogen atom, R is a hydrocarbon group having 1–20 carbon atoms, R' is an alkyl group, aryl group, vinyl group, or alkyl halide group having 1–20 carbon atoms, m is an integer of 1–4, and n is an integer of 0–2, provided that m+n is 2–4.

3. The oil extended rubber according to claim 1, wherein said copolymer rubber of a conjugated diolefin and an aromatic vinyl compound contains less than 10 wt % of a long chain aromatic vinyl compound unit comprising 8 or more linked molecules of aromatic vinyl compound.

4. The oil extended rubber according to claim 1, wherein the Mooney viscosity of the copolymer rubber of a conjugated diolefin and an aromatic vinyl compound (A) is from 80 to 200.

5. The oil extended rubber according to claim 1, wherein said extensible oil (B) is at least one oil selected from aromatic-type mineral oil having a viscosity gravity constant of 0.900–1.049 and an alicyclic-type mineral oil having a viscosity gravity constant of 0.850–0.899.

6. The oil extended rubber according to claim 1, which is obtained by adding an extensible oil to a rubbery polymer solution containing the copolymer rubber of a conjugated diolefin and an aromatic vinyl compound (A), removing the solvent from the mixture, and drying the residue.

7. A rubber composition comprising the oil extended rubber of claim 1 in an amount of 30 wt % or more of the total amount of rubber components and carbon black and/or silica, respectively, in an amount of 2–100 parts by weight or 30–100 parts by weight for 100 parts by weight of the total amount of rubber components, as fillers, and, when silica is contained, a silane coupling agent in an amount of 1–20 parts by weight for 100 parts by weight of silica.

8. A rubber composition comprising, the oil extended rubber of claim 1 in an amount of 30 parts by weight or more of the total amount of rubber components and, as fillers, (a) a total of 30–100 parts by weight of carbon black and silica for 100 parts by weight of the total amount of rubber components, (b) 30–100 parts by weight of carbon-silica dual-phase-fillers for 100 parts by weight of the total amount of rubber components, or (c) a total of 30–100 parts by weight of carbon-silica dual-phase fillers and carbon black and/or silica for 100 parts by weight of the total amount of rubber components, and a silane coupling agent in an amount of 1–20 parts by weight for 100 parts by weight of the carbon-silica dual-phase-fillers and carbon black and/or silica.

9. The rubber composition according to claim 7 or 8, of which the vulcanized product is used for tire tread.

* * * * *